(12) United States Patent
Bisdikian et al.

(10) Patent No.: US 8,676,194 B2
(45) Date of Patent: Mar. 18, 2014

(54) METHOD AND APPARATUS FOR PRECONDITIONING MOBILE DEVICES FOR NETWORK AND OTHER OPERATIONS

(75) Inventors: Chatschik Bisdikian, Chappaqua, NY (US); John Frederick Morar, Mahopac, NY (US); Edith Helen Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1068 days.

(21) Appl. No.: 12/030,675

(22) Filed: Feb. 13, 2008

(65) Prior Publication Data

US 2008/0132219 A1    Jun. 5, 2008

Related U.S. Application Data

(63) Continuation of application No. 10/736,184, filed on Dec. 15, 2003, now Pat. No. 7,486,930.

(51) Int. Cl.
*H04W 4/00* (2009.01)

(52) U.S. Cl.
USPC ..................................................... 455/432.2

(58) Field of Classification Search
USPC .................................. 455/418, 550.1, 432.3
See application file for complete search history.

(56) References Cited

U.S. PATENT DOCUMENTS

| | | | |
|---|---|---|---|
| 5,572,221 A * | 11/1996 | Marlevi et al. ................. | 342/452 |
| 5,841,763 A * | 11/1998 | Leondires et al. ............. | 370/260 |
| 6,006,039 A * | 12/1999 | Steinberg et al. .............. | 396/57 |
| 6,052,600 A | 4/2000 | Fette et al. | |
| 6,091,765 A * | 7/2000 | Pietzold et al. ................ | 375/219 |
| 6,243,755 B1 | 6/2001 | Takagi et al. | |
| 6,734,808 B1 * | 5/2004 | Michaelson et al. .......... | 340/984 |
| 7,016,462 B1 * | 3/2006 | Keville et al. .................. | 378/47 |
| 2002/0082044 A1 * | 6/2002 | Davenport ..................... | 455/552 |
| 2003/0050055 A1 | 3/2003 | Ting et al. | |
| 2003/0114206 A1 * | 6/2003 | Timothy et al. ................ | 455/575 |
| 2003/0143988 A1 * | 7/2003 | Jamadagni ..................... | 455/418 |
| 2003/0143989 A1 * | 7/2003 | Ho et al. ........................ | 455/418 |

FOREIGN PATENT DOCUMENTS

GB       2350749       12/2000

OTHER PUBLICATIONS

"Digital Modular Radio to Revolutionize Naval Wireless Communications," Motorola WITS Reduces Costs and Improves Battle Readiness, Motorola, 2 pages, Feb. 2000.

* cited by examiner

*Primary Examiner* — Temica M Beamer
*Assistant Examiner* — Joel Ajayi
(74) *Attorney, Agent, or Firm* — Anne V. Dougherty; Ryan, Mason & Lewis, LLP

(57) ABSTRACT

Techniques are provided for providing automated configuration of computing devices. More particularly, principles of the invention may use anticipated context to precondition a device whose operational mode is alterable via computer controllable operations. Anticipated context may be affected by any number of parameters including, but not limited to, current location, time of day, destination end-point, e.g., phone number to be called, past history, subscription rate plans, power requirements of device, application demands with respect to quality-of-service (QoS), security, calendar information, and so on. Further, principles of the invention may use locally derived knowledge about the intended use of a device and dynamically enable it in a desirable mode of operation using locally reachable configuration parameters stored in advance based on the anticipated context for the operation of the device. Still further, principles of the invention may dynamically locate necessary configuration parameters via a service discovery process.

23 Claims, 4 Drawing Sheets

METHOD AND APPARATUS FOR PRECONDITIONING MOBILE DEVICES FOR NETWORK AND OTHER OPERATIONS

CROSS-REFERENCE TO RELATED APPLICATION(S)

This application is a continuation of U.S. application Ser. No. 10/736,184 filed on Dec. 15, 2003, the disclosure of which is incorporated herein by reference.

FIELD OF THE INVENTION

The present invention relates to techniques for providing automated configuration of computing devices and, more particularly, to techniques for preconditioning mobile devices using anticipated context parameters pertinent to future operational conditions for the device.

BACKGROUND OF THE INVENTION

The advent of "software defined radios" (hereinafter "SDRs") promises a substantial increase in the communication capabilities of moveable computing devices. Some examples of SDRs are disclosed in U.S. Pat. No. 6,091,765 issued to A. W. Peitzold, III, et al. on Jul. 18, 2000 and entitled "Reconfigurable Radio System Architecture;" U.S. Pat. No. 6,052,600 issued to B. A. Fette et al. on Apr. 18, 2000 and entitled "Software Programmable Radio and Method for Configuring;" and U.S. Patent Application No. 20030050055 filed in the name of P. Ting et al. on Mar. 13, 2003 and entitled "Software Defined Radio (SDR) Architecture for Wireless Digital Communication Systems;" the disclosures of which are incorporated by reference herein.

The communication technologies and protocols that an SDR uses can be adjusted "on-the-fly" via software controls. Because of this capability, SDR-enabled devices gain tremendous resiliency in establishing and maintaining communications in a diverse communications environment as compared to devices that use fixed radios, e.g., a cellphone designed to operate only on a GSM (Global System for Mobile Communication) network. Even if multi-band cellular devices are considered, SDR-enabled devices offer considerable advantages in that they use a single programmable radio interface, rather than multiple radio interfaces, each one designed to operate over a single cellular network. This enables devices to have a small form factor and exploit substantial economies of scale.

A challenging problem regarding SDRs and, more generally, devices whose mode of operation (e.g., as defined by the communications protocols currently used by an SDR) can be affected dynamically via computer operations is to decide when and how the mode of operation should be altered in order to achieve a desired goal, for instance, maximizing the utility of the SDR, minimizing the cost of operation, minimizing the power consumption or other goal. The aforementioned computer operations are typically software-written procedures executed on a computer microchip. Another problem pertains to making available to the device the appropriate set of computer operations by the time that they will be needed to effect a change in its mode of operation.

U.K. Patent Application No. 2,350,749 filed in the name of P. McAndrew et al. on Jun. 1, 1999 and entitled "Transferring Configuration Data to a Software Defined Radio Apparatus," the disclosure of which is incorporated by reference herein, discloses how configuration parameters or software for an SDR-enabled device can be physically transferred conveniently to the device via use of a "cradle." Further, U.S. Patent Application No. 20020082044 filed in the name of D. V. Davenport on Jun. 27, 2002 and entitled "Wireless Communication with a Mobile Asset Employing Dynamic Configuration of a Software Defined Radio," the disclosure of which is incorporated by reference herein, discloses the use of a location discovery technique to identify the location of a mobile asset, e.g., a truck, equipped with an SDR-enabled device and then to configure the SDR based on the radio technologies used in that location.

However, existing SDRs focus on the actual process of configuring the radio interface or retrieving from, for example, a server, the configuration parameters needed for the configuration.

U.S. Pat. No. 6,243,755 issued to Tagaki et al. on Jun. 5, 2001 and entitled "Information Processing System Using Information Caching Based on User Activity," the disclosure of which is incorporated by reference herein, discloses a system where the user using a personal device retrieves user-oriented application level content from a remote server(s), e.g., e-mail documents. However, Tagaki et al. is concerned exclusively with the act of transferring of information from one device to another. As this information is targeting the (human) user of the recipient device, Tagaki et al. does not consider the case in which this information may affect the operation of the target device itself.

Thus, a need exists for techniques for preconditioning mobile devices using anticipated context parameters pertinent to future operational conditions for the device.

SUMMARY OF THE INVENTION

Principles of the present invention provide for automated configuration of computing devices. More particularly, principles of the invention may use anticipated context to precondition a device whose operational mode may be alterable via computer controllable operations.

In a first aspect of the invention, for example, a technique for preconditioning a computer-controllable device includes the following steps/operations. At least one anticipated context with which the device may be associated is determined. At least one mode of operation associated with the at least one anticipated context is determined such that the at least one mode of operation may be effectuated before or at a time when the anticipated context is at least partially realized.

The technique may further include determining at least one action used to enable the at least one mode of operation. At least one anticipated context may include at least one of a location, a time, a destination, a power capacity, a policy, and a history associated with the device. The operation mode determining step/operation may further include employing at least one parameter used to realize the operation mode. The at least one parameter may be available from a local store and/or a remote store. The at least one parameter may be available from a Web service. The operation mode determining step/operation may further include a consideration of at least one of cost, power, experience, workflow, and coverage associated with the device. The device may include a mobile device. The device may include a software defined radio.

In a second aspect of the invention, for example, a technique for altering a mode of operation of a system having at least one computer controllable subsystem associated therewith includes the following steps/operations. Responsive to at least one projected context, at least one projected mode of operation for the system is determined. Responsive to the at least one projected mode of operation, at least one computer operation for the at least one computer controllable subsystem is provided. The operation enables the at least one projected mode of operation, such that, responsive to the at least one computer operation, a current mode of operation of the system may be altered to the projected mode of operation.

The technique may further include selecting a projected mode of operation, when two or more projected modes of operation are determined. The computer controllable subsystem may include a communications subsystem. The projected mode of operation may be associated with one or more communication capabilities. The communications subsystem may include a software defined radio. The step/operation of providing at least one computer operation may further include a service discovery process.

In a third aspect of the invention, for example, a technique for obtaining protocol information for a software defined radio (SDR) includes the following steps/operations. A projected context associated with the SDR is determined. Responsive to the projected context, at least one parameter related to a communication protocol for use by the SDR is determined. An indicator of the at least one parameter is provided such that the at least one parameter may be employed.

The technique may further include obtaining multiple protocols. Determining a projected context may be responsive to at least one of an SDR user calendar, an SDR user data entry, a current context, a workflow, and an SDR user history. The current context may include at least one of a current location, an indicator of remaining battery power, one or more current protocol settings, and current latency experienced. Determining a projected context based on a current location may include use of a projected location. Determining at least one parameter may include optimizing at least one of an end-to-end cost, latency, and security. Determining at least one parameter may include use of at least one of an algorithm, a database lookup, and a Web service. The algorithm may provide optimization of at least one of a cost to user, a battery life, and a latency. Determining at least one parameter may be further responsive to at least one of a user policy, an owning enterprise policy, and a security policy. Providing an indicator may include at least one of providing a protocol download, a parameter download, a uniform resource locator, a parameter address, an identifier, an Internet Protocol address, a diskette, a control string and an indicator to a device that an update is available for download. Providing an indicator may be performed wirelessly. Providing an indicator may include providing an indicator to a device associated with the SDR. The at least one parameter may be operative to select between network providers.

In a fourth aspect of the invention, a technique for obtaining protocol information for a software defined radio (SDR) includes the following steps/operations. An indicator of a target of communication is received. Responsive to the target indicator, at least one parameter related to a communication protocol for use by the SDR is determined. An indicator of the at least one parameter is provided such that the at least one parameter may be employed. Receiving an indicator of target may include at least one of receiving a telephone number, receiving an Internet Protocol address, and a data type.

Advantageously, anticipated context may be affected by any number of parameters including, but not limited to, current location, time of day, destination end-point, e.g., phone number to be called, past history, subscription rate plans, power requirements of device, application demands with respect to quality-of-service (QoS), security, calendar information, and so on. Further, principles of the invention may use locally derived knowledge about the intended use of a device and dynamically enable it in a desirable mode of operation using locally reachable configuration parameters stored in advance based on the anticipated context for the operation of the device. Still further, principles of the invention may dynamically locate necessary configuration parameters via a service discovery process.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The techniques of the invention will be exemplified on a device equipped with an SDR and having access to a local or nearby available storage. It should be understood though that the invention is not restricted to only such devices. By way of example only, the invention may be applicable not only to the SDR in a device, but to its communication subsystem in general, its input/output modality capabilities, display fonts, and so on.

As will be illustratively explained in detail below, the invention may precondition an SDR-enabled device to configure its SDR dynamically as its operational context changes during, for example, the course of a day. For example, the invention considers the possibility in which the SDR-enabled device may be expected to be used in the same location for multiple purposes and it would thus be advantageous for the device to be preconditioned to allow its operation for such purposes. For instance, an SDR-enabled cellular phone may be used for both business and personal purposes, and for each purpose a different carrier, carrier plan, and carrier technology may have to be utilized. Based on, for example, the phone number called, the SDR-enabled phone may select the appropriate carrier, carrier plan, and carrier technology to use. In accordance with the invention, this is made possible by making the collection of necessary configuration parameters already available in the SDR-enabled device so as to allow the device to make a selection among these parameters based on locally and dynamically derived criteria, e.g., the number to which a call is placed. This, in turn, is made possible by the SDR-enabled device, and/or a provider service for configuration parameters, anticipating the collection of potential context situations and corresponding operational modes that the device may encounter during, e.g., the course of a day, and making available the appropriate SDR configuration parameters to the device in advance. The invention provides such features and advantages.

Thus, advantageously, principles of the invention may precondition a device based on past history, phone plan subscriptions, the set of applications that may be run and the requirements that they impose on the underlying communications network, external network conditions and so on. However, it is to be understood that the invention is not limited to any particular criterion.

Figure 1:
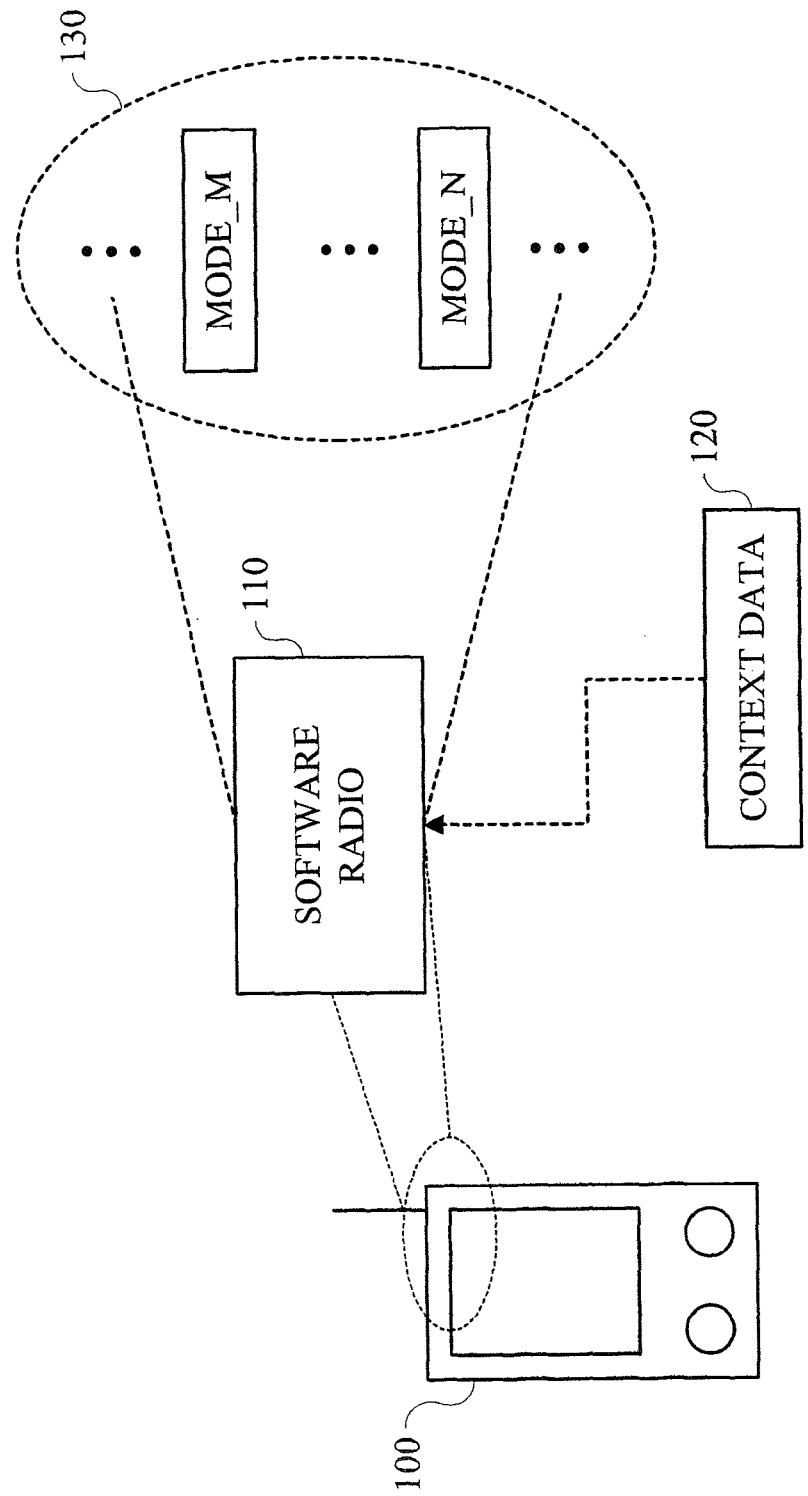
FIG. 1 is a block diagram illustrating a system using an SDR-enabled device, whose SDR alters its mode of operation based on context data, according to an embodiment of the present invention.

Referring initially to FIG. 1, a block diagram illustrates a system using an SDR-enabled device, whose SDR alters its mode of operation based on various context data, according to an embodiment of the present invention.

More particularly, FIG. 1 shows a personal device 100 equipped with an SDR (software-defined radio) 110. With regard to this invention, personal devices can cover a wide variety of devices from personal mobile devices like cellphones and personal digital assistants (PDAs), to portable devices like notebook computers, to movable devices like trucks and trains. Additional examples of such a personal devices include the M3TR Multimode Multirole Multiband Tactical Radio) from Rohde and Schwartz, targeted to military applications, and the Motorola DMR (Digital Modular Radio), also targeted to military applications.

The figure underscores the use of context data that is being used to configure the radio for operating in any one of a large number of alternative modes of operation enabled by the radio. In particular, a collection of context data 120, e.g., time of day, location, battery reserve level, and so on, is used as decision inputs that could influence the mode of operation 130 (e.g., mode_1, . . . , mode_m, mode_n, . . . ) that the SDR could choose to use next.

Figure 2:
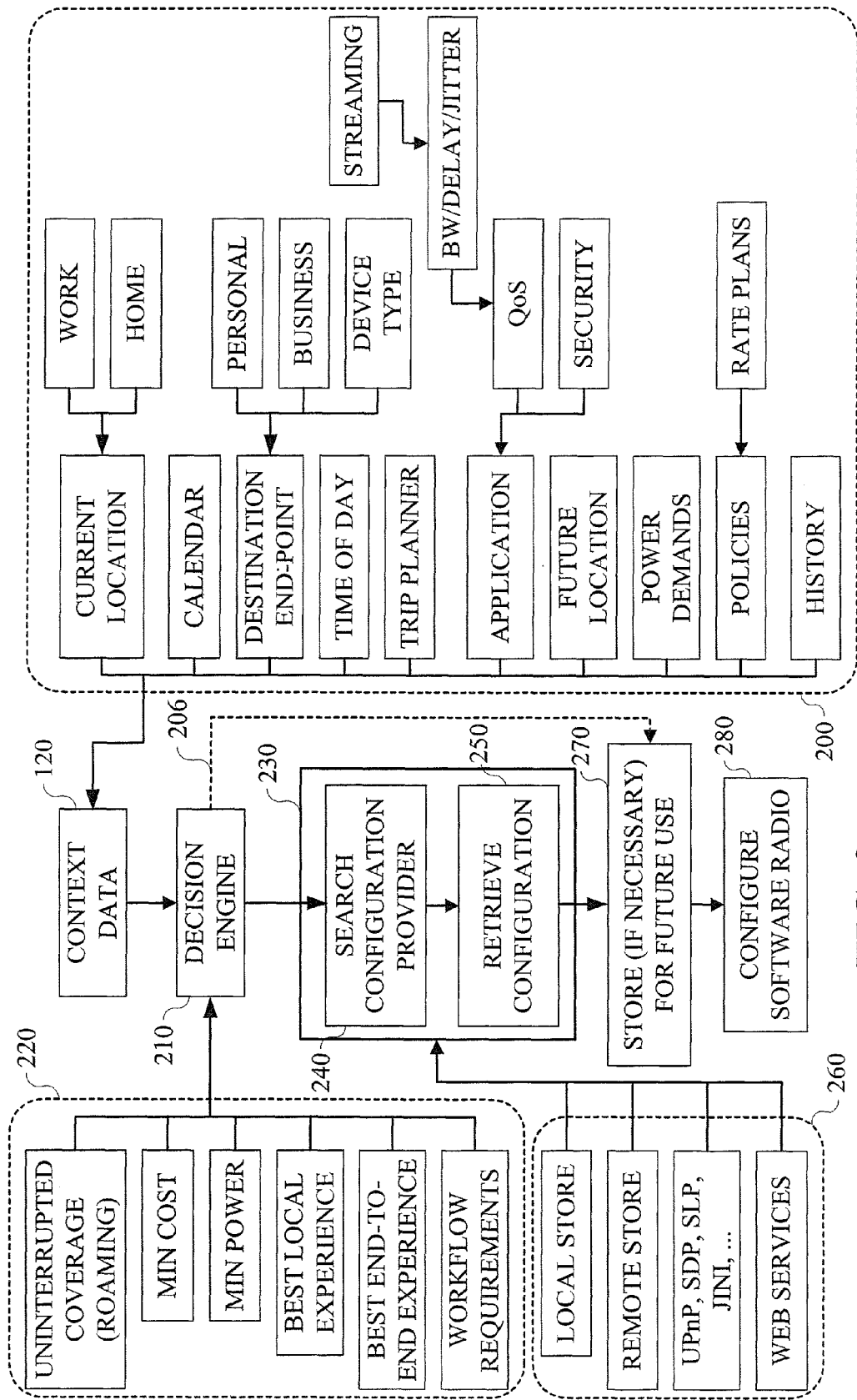
FIG. 2 is a block/flow diagram illustrating a methodology used to configure an SDR based on context data, decision criteria, and storage options for the configuration parameters, according to an embodiment of the present invention.

Referring now to FIG. 2, a block/flow diagram illustrates a methodology used to configure an SDR based on various context data, decision criteria, and storage options for the configuration parameters, according to an embodiment of the present invention.

FIG. 2 highlights three exemplary features that the invention employs to enhance the experience of users when they use their personal devices. This includes (a) the type of context data 200 that can be used to drive (b) a decision engine 210 whose responsibility is to decide what configuration mode shall be applied to the radio, and why and when. Finally, when a selection is made, there is the process of (c) locating and fetching the necessary configuration parameters that will be used to configure the radio when it becomes necessary 230. It is to be appreciated that the SDR-enabled device (e.g., device 100) performs and/or enables implementation of these operations/modules. The steps of this methodology may be performed in the apparatus containing the SDR. Alternatively, some or all steps may be performed in systems external to the SDR, for example, an enterprise server associated with the user of the SDR.

According to the invention, the radio configuration may occur in a look-ahead mode of operation, i.e., based on context information (e.g., a trip planner, past history, etc.). That is, the decision engine can identify what configuration parameters will be needed for a subsequent time period and prefetch the appropriate configuration parameters. This approach enables the personal device to intelligently respond to its future needs, without the need to maintain a huge local store that stores every possible configuration set.

Discovery and fetching of the necessary configuration parameters could happen via a number of alternative methods. One such alternative is through Web services, a technology that allows the registration, advertisement, and access of networked services using open-standards communication and information exchange procedures over the World Wide Web. The potential of pre-fetching configuration information also enables the personal device to retrieve configuration in advance while it is still capable of communications, rather than wait until a later time when communication may not be guaranteed because of the location that the device finds itself in.

Specifically, in the example embodiment shown in FIG. 2, context data 120 can be obtained from a diverse set of information sources, a non-exhaustive list of which is shown in 200 (e.g., current location, calendar, destination end-point, time of day, trip planner, application, future location, power demands, policies, history, etc.). The context data is used by decision engine 210, which decides what will be the next mode of operation for the SDR based on a set of decision criteria, a non-exhaustive list of which is shown in 220 (e.g., uninterrupted coverage, minimum cost, minimum power, best local experience, best end-to-end experience, workflow requirements, etc.).

When a decision is made, the necessary configuration parameters needed by the SDR are located (230). The configuration parameters may be found in several places and through several mechanisms, a non-exhaustive list of which is shown in 260. For example, the configuration parameter may be provided (240) by a local or remote store, located using a service discovery method, e.g., using the Universal Description, Discovery, and Integration protocol for Web services (UDDI), Universal Plug and Play (UPnP), Service Discovery Protocol (SDP), Service Location Protocol (SLP), Jini protocol, etc.

When an appropriate provider has been identified, the configuration parameters are retrieved (250). At this point, a decision could be made (206) to store (270) these parameters at a known location for easy retrieval for future use. Finally, with the configuration parameters available, the software radio can be configured (280) to implement the decision made by the decision engine 206.

Figure 3:
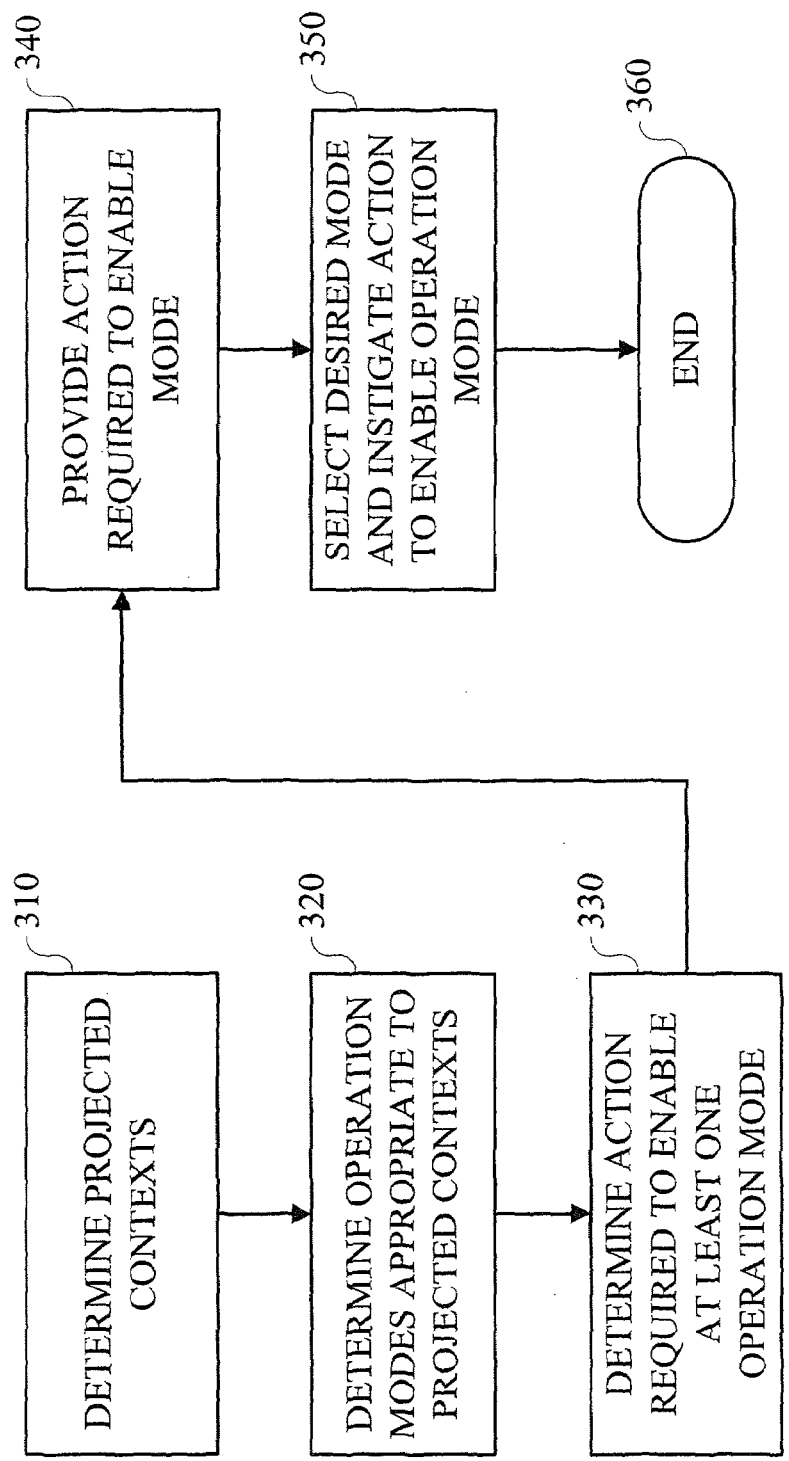
FIG. 3 is a flow diagram illustrating a device preconditioning methodology, according to an embodiment of the present invention.

Referring now to FIG. 3, a flow diagram illustrates a device preconditioning methodology, according to an embodiment of the present invention. It is to be appreciated that the SDR-enabled device (e.g., device 100) performs and/or enables implementation of these operations/modules. The steps of this methodology may be performed in the apparatus containing the SDR. Alternatively, some or all steps may be performed in systems external to the SDR, for example, an enterprise server associated with the user of the SDR.

As shown, in 310, the methodology determines at least one projected (i.e., anticipated) context. Projected context may include factors related to physical constraints or optimizations, usage constraints or optimizations, user preferences, user policy constraints, and so on. Factors related to physical constraints include, but are not limited to, location, battery power, network coverage, expectations of aggregate network usage (e.g., expectations that there will be geographic congestion associated with many requests in a short time period by multiple users), projected location, projected network coverage, projected network usage, and so on. These factors may be determined by algorithms projecting from historical data, from examination of calendar entries, from examination of calendar entries in conjunction with publicly available data (e.g., network coverage maps) and so on. Further, location constraints may include projection of venue, physical or policy constraints. For example, it may be projected that a user will be in a venue with thick walls implying that deep wall penetration will be difficult. In another example, hospitals may have policies prohibiting some wireless networks or protocols to ensure that there will not be any interference with hospital equipment.

Factors related to usage constraints include, but are not limited to, expectations of voice conferences, expectations of data conference, expectation of reception or transmission of digital media, expectations of communications with a second user where the second user has a network preference, expectations of security requirements, expectations of security requirements of a second user where communication is projected with the second user and the second user has security requirements, and so on. These factors may be determined by algorithms projecting from historical data, from examination of calendar entries, from preferences, from examination of this data in conjunction with enterprise or publicly available data. For example, an enterprise user may be required to listen to all intracompany announcements given by the company CEO. If the corporate communications schedule includes a speech by the CEO, this may imply that the user expects to receive a video stream, with expectations of sufficient bandwidth and latency. In another example, analysis of unstructured data may allow projection of communications needs. That is, e-mail may indicate, for example, that a presentation will be sent, thus implying a bursty transmission of several megabytes.

Factors related to user preferences include, but are not limited to, static profiles, including network subscriptions, historical expression of preferences, preferred peripherals (e.g., large screen may indicate requirements for more bandwidth), analysis of unstructured data (e.g., natural language examination of e-mail that indicates a preference for clear audio in preference to detailed imagery), and so on. These factors may be determined by, but not limited to, examination of profiles, analysis of historical patterns, examination of associated data (e.g., e-mail), and so on.

Factors related to user policy constraints include, but are not limited to, policies related to cost, policies related to venue usage (e.g., hospital employees may not be allowed to use radio devices utilizing the IEEE 802.11 radio communication standards in certain locations), thresholds of usage for particular networks, and so on.

Once appropriate projected contexts have been determined, the methodology continues in 320 to determine operation modes appropriate to these projected contexts. This may include determining all possible operation modes, and selecting one or more appropriate modes. Selecting an appropriate mode may include, but is not limited to, selecting a mode related to a network to which the user has a subscription, selecting a mode that provides a minimum bandwidth, selecting a mode that uses a maximum power consumption, selecting a mode that provides a minimum security level, and so on.

Once operation modes have been determined, the methodology in 330 determines the action required to enable the modes. Such actions may include, but are not limited to, obtaining parameters required for the mode, transmitting required parameters to the device, obtaining executable software required for the mode, transmitting executable software to the device containing the SDR (subsequently, we will refer to such a device as the target device) obtaining a triggering mechanism required for the mode, transmitting the triggering mechanism to the target device, transmitting any of these mechanisms to an intermediate device for later transmission to a target device, and so on.

In 340, the methodology provides the action required to enable the mode of 330. This may include, but is not limited to, transmitting an indication of the actions determined in 330 to the target device, transmitting an indication of the actions to an intermediate device, obtaining the required software and parameters and transmitting them to the target device or an intermediary device, and so on.

In 350, the methodology selects the desired mode and executes the required action to enable the operational mode.

In the case that the mode of operation is related to communications, selection of a communications mode of operation may include, but is not limited to, a selection based on an optimization for cost, an optimization for bandwidth, an optimization for battery life, a preference for a network, an algorithm aggregating network usage for an entity such as an enterprise, a user selection among multiple appropriate modes, and so on. Executing the action may include, but is not limited to, executing code, changing communication parameters, terminating a previous communication mode, and so on. The step of 350 may be performed by a server or by the target device.

The methodology ends at 360.

Following are additional exemplary embodiments of the invention teaching the use of various types of information including projections into the future states in order to set the current operating characteristics and achieve global optimization of anticipated future situations.

For example, the invention realizes that multidimensional optimization that anticipates future state can lead to non-obvious choices for settings. Take, for example, the case in which there are multiple channels available for communication from an SDR in a cellular phone. One channel may be through the radio network provided by a phone company, another may be a Bluetooth connection to a nearby computer. Further suppose that the Bluetooth connection may be of poor quality relative to the radio network connection and that the radio network connection does not result in incremental expense for usage. Further assume the phone battery is fully charged and that the power consumption for the Bluetooth connection is lower than the radio network connection. The invention realizes that the decision about which channel to choose could be based on expected future battery usage based on projected locations and usage profiles. For instance, calendar information may be used to infer that several hours of conference calls are planned for later in the day and hence lead to a selection that limits battery usage at all costs. On the other hand, the business day may be nearly over, from which the software concludes that conserving battery power is not necessary and thus the higher quality radio connection is selected.

Another example of using anticipated state to formulate decisions involves pre-provisioning for the use of services. For example, from schedule information, the software could automatically decide (potentially taking into account other goals that compete for the same resources) to cache printer information (e.g., locations and names) for the destinations that will be visited in the future. This would be done to enable the device to provide print functions at any time by using onboard caching to hold the data until the printer service is available, as in, but not limited to, the case of a Bluetooth accessible printer which requires physical proximity in order to provide the final printout. Operationally, this function could be manifested in the following scenario: A user interacts with device to print; the user is presented with a list of available printers that includes printers for locations he will be visiting during the next 24 hours and then selects a Bluetooth enabled printer in the hotel where he will be staying the next day (which is currently beyond Bluetooth range). The phone caches the information to be printed, and when it is within range of the Bluetooth printer, alerts the device operator that it is now possible to print. The advantage of this embodiment is that connectivity or computational capabilities could either be unavailable or more expensive at the time when the operator is interested in using the print capabilities of his device.

Another example of using anticipated state to formulate decisions involves transmission of data from the SDR in a cellular phone to a destination. It may be the case that there is a quantity of data that needs to be delivered by end-of-business and can be sent over the radio network at incremental bandwidth expense, but that the anticipated location will provide a lower cost alternative in the future. If this lower cost alternative will be available within the needed delivery time, then total expense will be minimized by holding the transmission within memory of the phone until the lower cost alternative is available. However, based on continual monitoring of the anticipated future state, the phone may choose to transmit the data at any time via the slower channel when the anticipated future availability changes. Indeed, the phone may even be programmed to employ the slower channel at the latest time that will guarantee delivery, even if the less expensive channel is still expected to materialize.

Principles of the invention may also take into account the future state of shared resources. For instance, a program, individual or organizational entity may have several resources for transmitting data and it is an object of the collection of devices to collectively optimize their performance based on anticipated state. For instance, a phone may choose to transmit large amounts of data, such as pictures of streaming video, to a nearby laptop computer where it will be buffered for ultimate transmission at a later date to its eventual destination via an alternative mechanism which may include, but is not limited to, physical transfer of memory media, wireless communication of wired communication channels, and so on.

Further, the software defined radio may reserve or make advanced purchases of bandwidth or other network features based on anticipated state of the radio. It may, for instance, be less expensive to operate the software defined radio if it reserves, purchases or purchases options for services in the location or operating environment where it anticipates future needs. A phone may wish to provision a network to locally store metadata at the edge of the network for more rapid or assured access to the data. For example, suppose the phone has an application that runs locally and requires low latency access to a large database for proper operation. The phone could continuously force the repositioning of this data through commands to the radio network system to keep the data close by to minimize latency. For instance, the phone could be used as a communication link for an application that requires rapid data lookup for locally analyzing medical telemetry data in a mobile environment such as an ambulance or any other combination of conditions that could force changing communication conditions.

The software defined radio could also store its local state on a network or other available resource or start a shadowing or replication operation when anticipated future state might require the transfer of that state to another device, as when the battery or other necessary operational component or condition was not providing adequate service. This could provide uninterrupted or nearly uninterrupted service and/or minimize the loss of data. An example of this situation might be an accelerometer that detected eminent or potential physical destruction of the radio. A situation such as this might occur if the radio was dropped or reached a temperature at which operational components were in danger of failing. In the time before failure (e.g., the last few milliseconds), the phone could transmit its internal state to an external store in order to preserve the information.

Variations described for the present invention can be realized in any combination desirable for each particular application. Thus, particular limitations and/or embodiment enhancements described herein, which may have particular advantages to the particular application, need not be used for all applications. Also, it should be realized that not all limitations need be implemented in methods, systems and/or apparatus including one or more concepts of the present invention.

Principles of the present invention can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which includes all the features enabling the implementation of the methods described herein, and which—when loaded in a computer system—is able to carry out these methods.

"Computer program means" or "computer program" in the present context includes any expression, in any language, code or notation, of a set of instructions intended to cause a system having an information processing capability to perform a particular function either directly or after conversion to another language, code or notation, and/or reproduction in a different material form.

Thus, the invention includes an article of manufacture which includes a computer usable medium having computer readable program code means embodied therein for causing a function described above. The computer readable program code means in the article of manufacture includes computer readable program code means for causing a computer to effect the steps of a method of this invention. Similarly, the present invention may be implemented as a computer program product including a computer usable medium having computer readable program code means embodied therein for causing a function described above. The computer readable program code means in the computer program product includes computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

Figure 4:
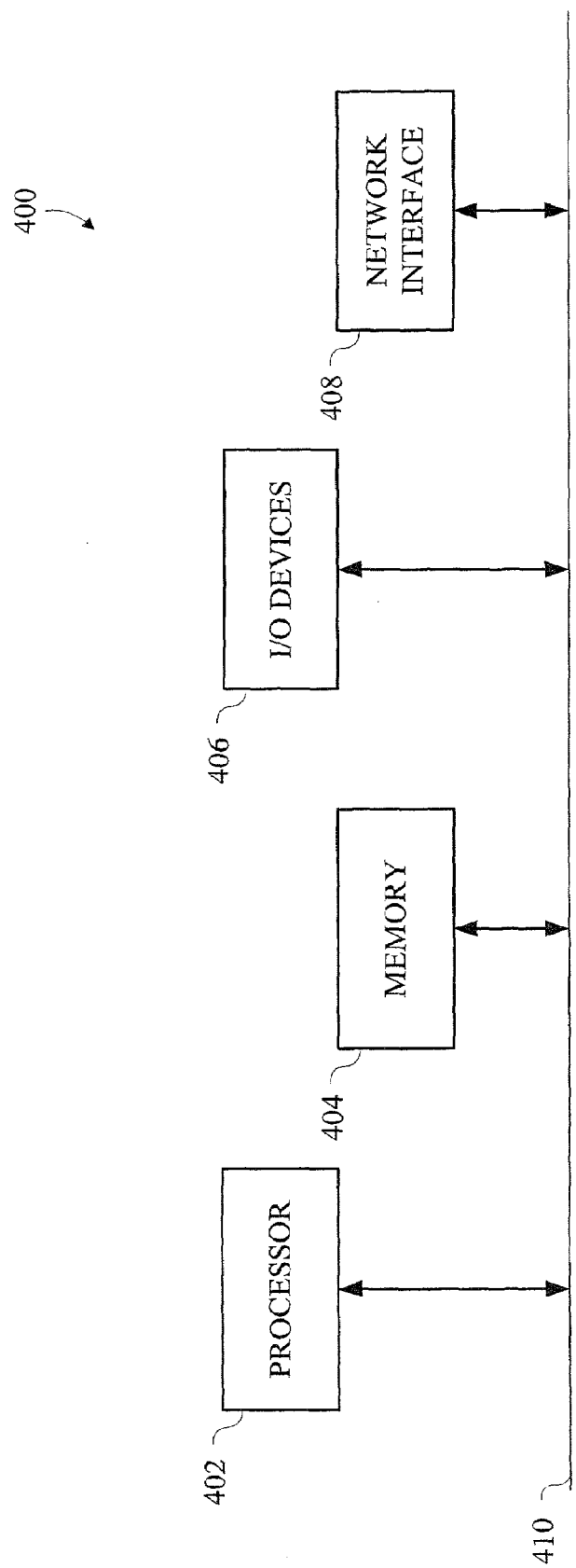
FIG. 4 is a block diagram illustrating a hardware implementation of a computer system in accordance with which one or more components/methodologies of the present invention may be implemented, according to an embodiment of the present invention.

By way of example only, FIG. 4 is a block diagram illustrating a hardware implementation of a computer system in accordance with which one or more components/methodologies of the present invention may be implemented, according to an embodiment of the present invention. For instance, such a computer system in FIG. 4 may implement personal device 100, software radio 110, and/or any other components mentioned herein. Thus, the illustrative methodologies described in the context of FIGS. 2 and 3 may be implemented on the computer system shown in FIG. 4.

It is to be understood that such individual components/ methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, computer system 400 may be implemented in accordance with a processor 402, a memory 404, I/O devices 406, and a network interface 408, coupled via a computer bus 410 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

What is claimed is:

1. Apparatus for preconditioning a computer-controllable device, comprising;
    a memory; and
    at least one processor coupled to the memory and operative to:
        collect context data that is associated with one or more contexts in which the device may be used at a future time;
        process the collected context data using a decision engine to determine at least one anticipated Intuit context in which the device may possibly be operated at a future time;
        determine at least one mode of operation of the device, which is associated with the at least one anticipated future context;
        identify and download at least one device configuration parameter for storage on the device, wherein the at least one device configuration parameter is associated with the at least one mode of operation of the device which is associated with the at least one anticipated future context, and which is not a current mode of operation of the device; and
        use the at least one device configuration parameter to pre-configure the device to enable the at least one mode of operation of the device before the anticipated future context is at least partially realized.

2. The apparatus of claim 1, wherein the processor is further operative to determine at least one action used to enable the at least one mode of operation.

3. The apparatus of claim 1, wherein at least one anticipated future context comprises at least one of as location, a time, as destination, as power capacity, a policy, and a history associated with the device.

4. The apparatus of claim 1, wherein the at least one configuration parameter is available from at least one of a local store and a remote store.

5. The apparatus of claim 1, wherein the at least one configuration parameter is available from a Web service.

6. The apparatus of claim 1, wherein the operation mode determining step further comprises a consideration of at least one of cost, power, experience, workflow, and coverage associated with the device.

7. The apparatus of claim 1, wherein the device comprises a mobile device.

8. The apparatus of claim 1, wherein the device comprises a software defined radio.

9. A communications system, comprising:
    a software defined radio (SDR); and
    an SDR-enabled device;
    wherein, responsive to at least one projected future context in which the communication system may possibly be operated at a future time, at least one projected mode of operation for the system is determined in accordance with the SDR-enabled device and, responsive to the at least one projected mode of operation, at least one computer operation is provided for the SDR, wherein the operation is to identify and download at least one device configuration parameter for storage on the SDR, wherein the at least one device configuration parameter is useable to preconfigure the SDR to enable the at least one projected mode of operation of the SDR, which is not a current mode of operation of the SDR, such that, responsive to the at Least one computer operation, the current mode of operation of the SDR is altered to the projected mode of operation before the projected future context is at least partially realized.

10. The coin communication system of claim 9, further comprising the step of selecting a projected mode of operation, when two or more projected modes of operation are determined.

11. The communication system of claim 9, wherein the computer controllable subsystem comprises a communications subsystem.

12. The communication system of claim 11, wherein the projected mode of operation is associated with one or more communication capabilities.

13. The communication system of claim 11, wherein the communications subsystem comprises a software defined radio.

14. The communication system of claim 9, wherein the step of providing at least one computer operation further comprises a service discovery process.

15. Apparatus for obtaining protocol information for a software defined radio (SDR), comprising:
   a memory; and
   at least one processor coupled to the memory and operative to:
   collect context data that is associated with one or more contexts in which the SDR may be operated at a future time
   process the collected context data using a decision engine to determine an anticipated future context for in which the SDR may possibly be operated at a future time;
   responsive to the anticipated future context, determine at least one configuration parameter related to a communication protocol that will be used by the SDR at the future time based on the anticipated future context; and
   provide an indicator of the at least one configuration parameter such that the at least one parameter may he employed at the future time;
   wherein the determination of the at least one configuration parameter further comprises identifying and downloading the at least one configuration parameter for storage on the SDR, wherein the at least one device configuration parameter is associated with the at least one mode of operation of the SDR which is associated with the at least one anticipated future context, and which is not a current mode Of Operation of the SDR, and using the at least one configuration parameter to preconfigure the SDR to enable at least one mode of operation of the SDR for implementing the communication protocol before the anticipated future context is at least partially realized.

16. The apparatus of claim 15, further comprising the step of obtaining multiple protocols.

17. The apparatus of claim 15, wherein determining an anticipated future context is responsive to at least one of an SDR user calendar, an SDR user data entry, a current context, a workflow, and an SDR user history.

18. The apparatus of claim 17, wherein the current context comprises at least one of a current location, an indicator of remaining battery power, one or more current protocol settings, and current latency experienced.

19. The apparatus of claim 18, wherein determining an anticipated future context based on a current location comprises use of a projected location.

20. The apparatus of claim 15, wherein determining at least one parameter comprises optimizing at least one of an end-to-end cost, latency, and security.

21. The apparatus of claim 15, wherein determining at least one parameter comprises use of at least one of an algorithm, a database lookup, and a Web service.

22. The apparatus of claim 21, wherein the algorithm provides optimization of at least one of a cost to user, a battery life, and a latency.

23. An article of manufacture for preconditioning a computer-controllable device, comprising a machine readable tangible storage medium comprising one or more programs which when executed implement the steps of:
   collecting context data that is associated with one or more contexts in which the device may be operated at a future time;
   processing the collected context data using a decision engine to determine at least one anticipated future context in which the device may possibly be operated at a future time; and
   determining at least one mode of operation of the device, which is associated with the at least one anticipated future context;
   identifying and downloading at least one device configuration parameter for storage on the device, wherein the at least one device configuration parameter is associated with the at least one mode of operation of the device which is associated with the at least one anticipated future context, and which is not a current mode of operation of the device; and
   using the at least one device configuration parameter to preconfigure the device to enable the at least one mode of operation of the device before the anticipated future context is at least partially realized.

* * * * *